Figure 9:
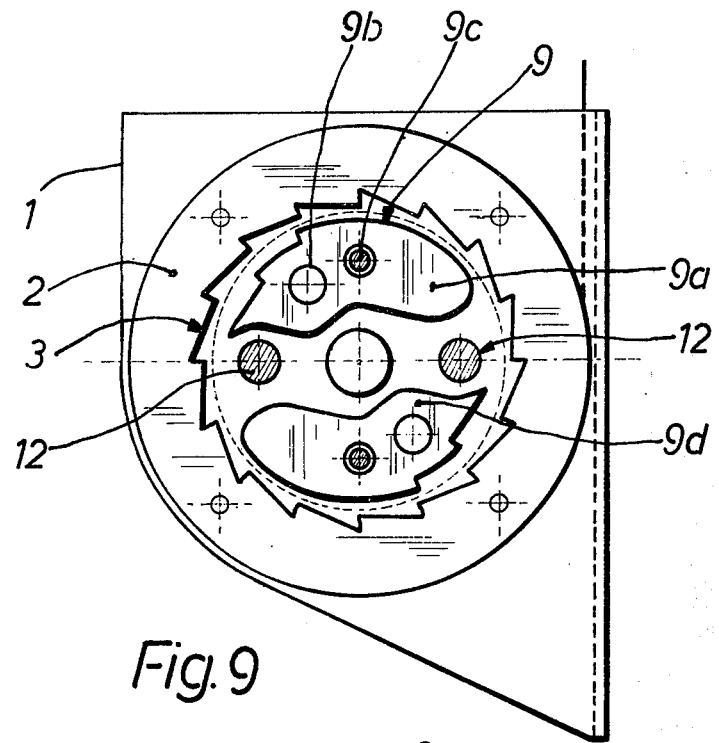

United States Patent [19]

Weman

[11] 3,955,774

[45] May 11, 1976

[54] BELT WINDER FOR SAFETY BELTS

[75] Inventor: Per Olaf Weman, Haslah, Germany

[73] Assignee: Sigmatex, A.G., Basel, Switzerland

[22] Filed: Nov. 25, 1974

[21] Appl. No.: 526,769

[52] U.S. Cl. .................. 242/107.4 A; 242/107.4 B
[51] Int. Cl.² ............................................. B65H 75/48
[58] Field of Search ........... 242/107.4, 107.5, 107.6, 242/107 R; 297/388; 280/150 SB

[56] References Cited
UNITED STATES PATENTS

| | | |
|---|---|---|
| 2,708,555 | 5/1955 | Heinemann ..................... 242/107.4 |
| 2,845,233 | 7/1958 | Pfankuch ......................... 242/107.4 |
| 3,568,948 | 3/1971 | Burns .............................. 242/107.4 |
| 3,604,655 | 9/1971 | Jones .............................. 242/107.4 |

Primary Examiner—Edward J. McCarthy
Attorney, Agent, or Firm—Ernest A. Polin; Ernest D. Buff

[57] ABSTRACT

A belt winder for safety for belts with at least one locking member engaging a fixed outer surface and responsive to movement of an inertia member which indicates sudden acceleration of the belt as a result of its relative motion to the shaft on which the belt is wound and unwound.

6 Claims, 16 Drawing Figures

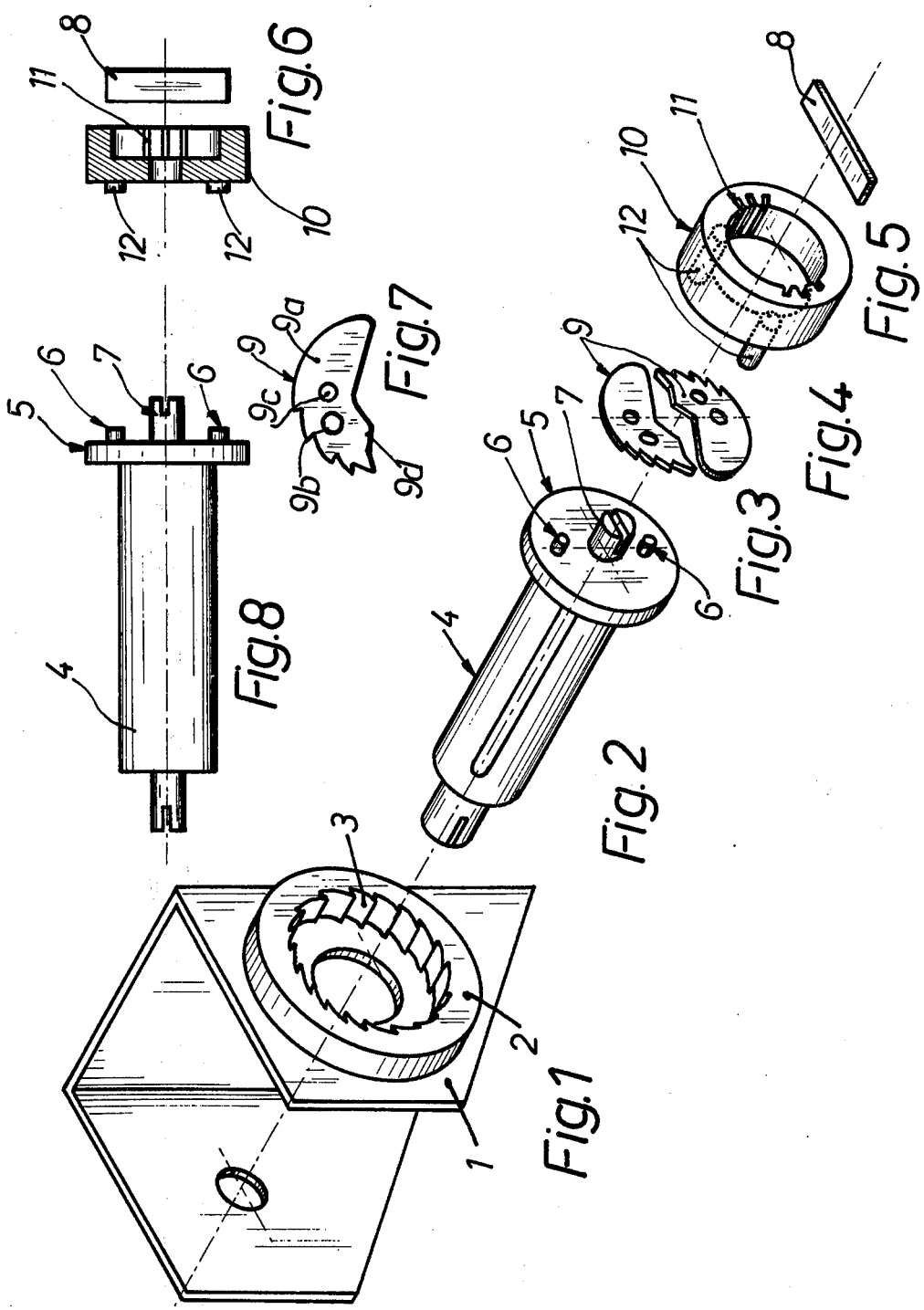

BELT WINDER FOR SAFETY BELTS

The invention relates to a belt winder for safety belts in vehicles, comprising a rotatable shaft onto which is wound the end of the belt which can be drawn out of the winder, and further comprising a locking mechanism whereby the shaft is locked to prevent any more of the belt from being drawn out when a predetermined angular acceleration is exceeded, the locking mechanism comprising an inertia member rotatably mounted on the shaft and a locking member, which is carried by the shaft by means of a pin and which can be moved into a locking position, in which it engages an abutment member fixed to the housing, through rotation of the inertia member relative to the shaft when there is rapid angular acceleration of the shaft.

Various belt winders are known, whereby the belt strip can be pulled off the belt roll and wrapped round the person to be protected while the vehicle containing the belt is traveling. When the person has put on the belt the winder exerts a pull on it to make it lie close against the body. In the case of an accident, on the other hand, it is necessary for the shaft of the winder to be locked so that the belt cannot then be pulled out.

The action of known locking mechanisms is dependent on the deceleration of the vehicle. A feeling means or senser, such as a pendulum, ball or other inertia member, will be displaced if the vehicle decelerates sharply and will cause the shaft to be locked.

In other locking mechanisms the winding shaft is locked in dependence on its rotational speed as the belt is pulled off, i.e. in dependence on the acceleration in the withdrawal of the belt strip or in dependence on the centrifugal force.

The embodiment affecting centrifugal force, in which the inertia member, e.g. a weight plate moves in an axial direction as soon as its angular position relative to the shaft moves, has the disadvantage that the inertia member is acted on by gravity. Thus, if the known apparatus is held or arranged vertically so that the inertia member has to move upwardly, the sensitivity and thus the responsiveness of the belt winder becomes considerably less than it would be if the apparatus were horizontal. Conversely, if the movement envisaged for the inertia member is in a downward direction sensitivity becomes too great. Another disadvantage is that locking takes place too late. Assuming that the inertia member moves from left to right during locking, no locking can take place if the winding shaft is accelerated to a degree corresponding to the angular acceleration in the direction of the axial movement of the inertia member, the weight plate; at least locking will only take place when such a great length of belt has been pulled out that the person wearing it does not have the required protection. Finally, the known apparatus also has the following disadvantage. Due to the axial movement of the inertia member the entire belt winder becomes so long that it can only be accommodated with difficulty in smaller vehicles.

In another known type of belt winder where there is again a response to centrifugal forces, the centrifugal force has an unfavourable effect on the locking mechanism. This leads e.g. to premature locking, which makes it difficult for a person to put on the belt conveniently at the beginning of a car journey.

Standards for safety belts prescribe a certain acceleration of the belt strip as the locking level. If the apparatus, as just described, includes a locking mechanism which responds to centrifugal force, locking will likewise be dependent on the speed of the belt strip when it is pulled out. This also has the disadvantge of making the belt difficult to use.

The invention therefore aims to construct a belt winder of the type defined at the beginning so as to avoid the abovementioned drawbacks. In particular, it aims to provide a quick-action locking means whereby, if the belt strip is abruptly pulled out, a locking member which responds only to angular acceleration - i.e. to the jerking of the belt strip - will definitely engage a securing member fixed to the housing, immediately after the acceleration takes place.

According to the invention this is achieved, in that the inertia member is in the form of a ring with two diametrically mounted pins at the end face and with engagement means for a spring, that the inertia member is coupled to the shaft by the spring, which is arranged in a cylindrical portion fixed to the shaft, and that the locking member is arranged between the inertia member and the shaft and has an engaging edge for the pin of the member. The inertia member is a type of fly-wheel which — when the belt strip is pulled slowly out of the winder — has the same angular speed as the shaft to which the end of the strip is attached and onto which the strip is wound. The locking member - or in another, desirable embodiment the two locking members - are mounted on the pin mentioned at the beginning. Their relationship to the centrifugal forces at the shaft is such that, when the belt strip is pulled out around the said pin, the locking members do not turn but instead remain stable relative to the shaft and inertia member and also take on the said angular speed. If a certain acceleration (the value of which is adjustable) is not exceeded, the angular speed could theoretically take on larger values without locking taking place. This means, advantageously, that the belt winder according to the invention does not respond to centrifugal forces, and certainly not by locking the belt.

On the other hand locking takes place immediately in response to angular acceleration, i.e. if the belt strip is pulled out abruptly, e.g. in an accident. This is due to the inertia member, which does not follow the abrupt increase in the angular speed of the shaft, so that a relative movement takes place between the inertia member and the shaft, and the locking members rotatably mounted on the shaft are turned positively relative to it. The front ends of the locking members then come into engagement with a locking ring provided with internal teeth. The belt winder according to the invention is immediately blocked.

An advantageous development of the invention has the features that the spring is in the form of a flat strip, that the cylindrical portion fixed to the shaft has a central slot, and that the inside of the ring of the inertia member has diametrically arranged groups of slots to receive the spring. The inertia member is fixed or, better, coupled to the shaft in a very appropriate and simple way by the strip-shaped spring. In addition, the response of the belt winder to the desired acceleration values may be adjusted by inserting the strip-shaped leaf spring in different places.

In accordance with the invention it is further desirable for a disc to be mounted on the shaft, having at least one pin for at least one locking member and the cylindrical portion, and for the external diameter of the disc to be approximately equal to that of the inertia member. Such turned parts with a disc fitted on a shaft can be made easily and cheaply. The mounting of the cylindrical portion and pins on the disc between the shaft and the inertia ring to be placed on it forms a side wall of compact, cylindrical housing. The smallness of the external dimensions make it easy to accommodate, even in confined spaces. In particular, the cylindrical portion and the inserted strip-shaped leaf spring do not extend out of the annular inertia member in an axial direction. The two pins mounted diametrically on the inertia member extend to the end face of the disc mounted on the shaft and thus into the plane of the locking member, though naturally at a spacing from that member.

In accordance with the invention it is also advantageous if the hole in the locking member is arranged at its centre of gravity, and if the locking member is arcuate, with locking teeth on the curved outer edge of the front end, and with the engaging edge for the pin of the inertia member at the other, inner edge of the same end. The space in the "cylindrical housing" described above thus contains the locking member. Its shape is therefore adapted to that of the "housing." The fact that the hole is arranged at the centre of gravity of the locking member means that there is a state of compensation or balance relative to the rotary pin, so that the advantages described above are satisfactorily obtained even with the specially constructed locking member. The provision of a plurality of teeth has the advantage that locking takes place immediately even if the tips of the teeth on the locking member should happen to lie opposite those on the ratchet-wheel fixed to the housing; this is because of the difference in the spacing between the teeth on the locking member and between those on the locking ring. If by chance the locking member should be opposite the ratchet-wheel in a central position before locking takes place, so that when the locking member turns relative to the shaft the teeth engage immediately, then a plurality of teeth can carry the load simultaneously; this is a measure which contributes a great deal to the strength and reliability of the locking mechanism.

In another embodiment of the invention the rear end of the locking member is preferably heavier than the front end. In this embodiment the other advantageous effect described at the beginning takes place when the locking members are not fully balanced, for centrifugal force in fact always ensures that the locking members are released. The same effect is achieved, in accordance with the invention, if a hole is provided in the front end of the locking member. Depending on the size of the hole, instead of the locking member haing a greater weight at the rear end the weight at the front end can be reduced and the balance thereby upset in the desired sense.

In a further advantageous embodiment of the invention the inertia member itself has locking teeth on its outer periphery and is coupled to the shaft by a curved spring. The outer, off-set or bent end of the spring is pressed into the inside of the annular inertia member under the tension of the spring. This embodiment provides the unexpected advantage that, as the resistance force of the extended or compressed spring increases, the extension and slipping and thus the responsiveness of the locking device remains substantially constant. Thus a type of dual action is achieved with the curved spring and with the off-set end of the spring lying against the inside of the inertia member, so that when the critical acceleration value occurs the locking members exert their blocking action immediately without delay.

Figure 10:
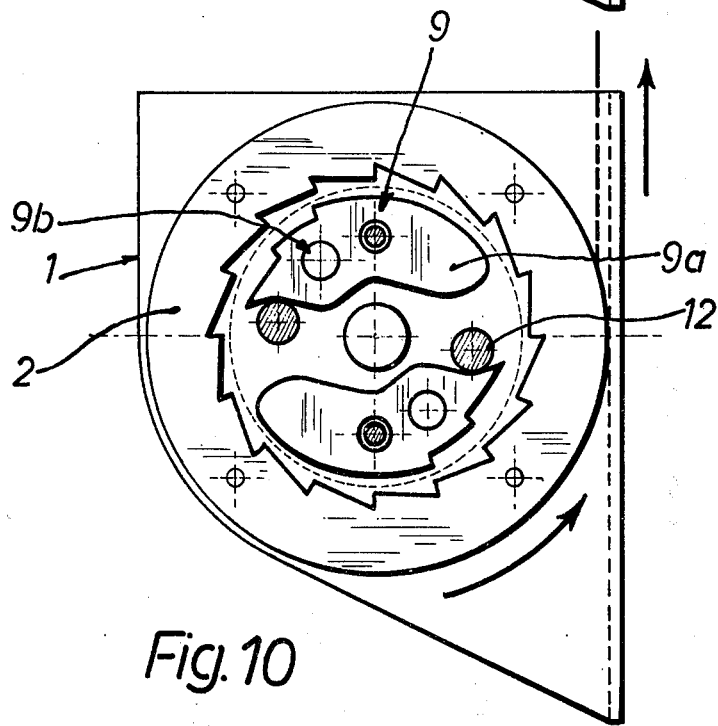
Figure 11:
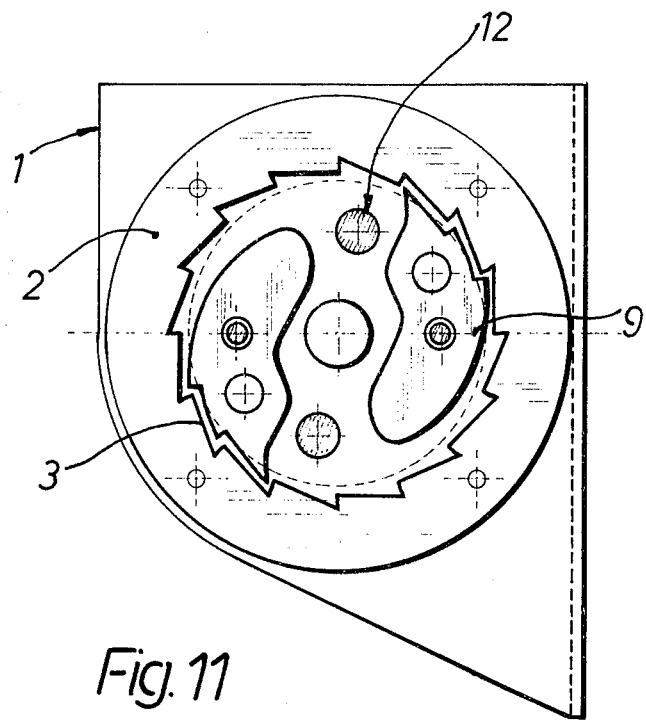
Figure 12:
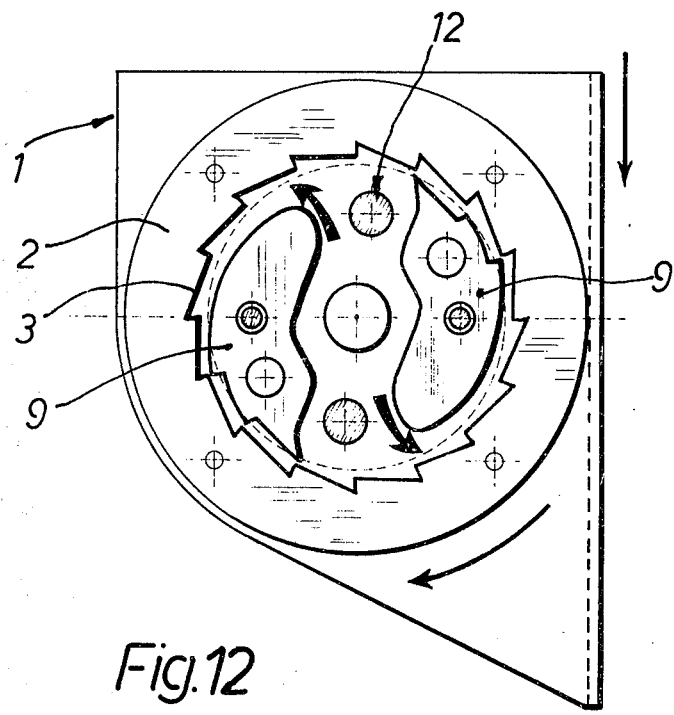
Figure 13:
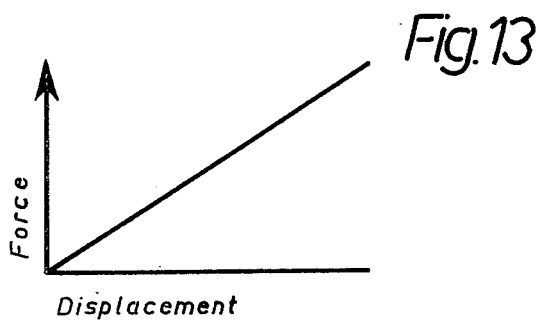
Figure 14:
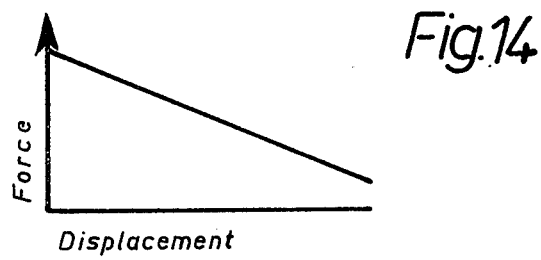
Figure 15:
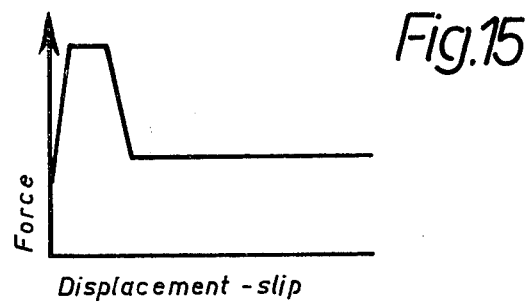
Figure 16:
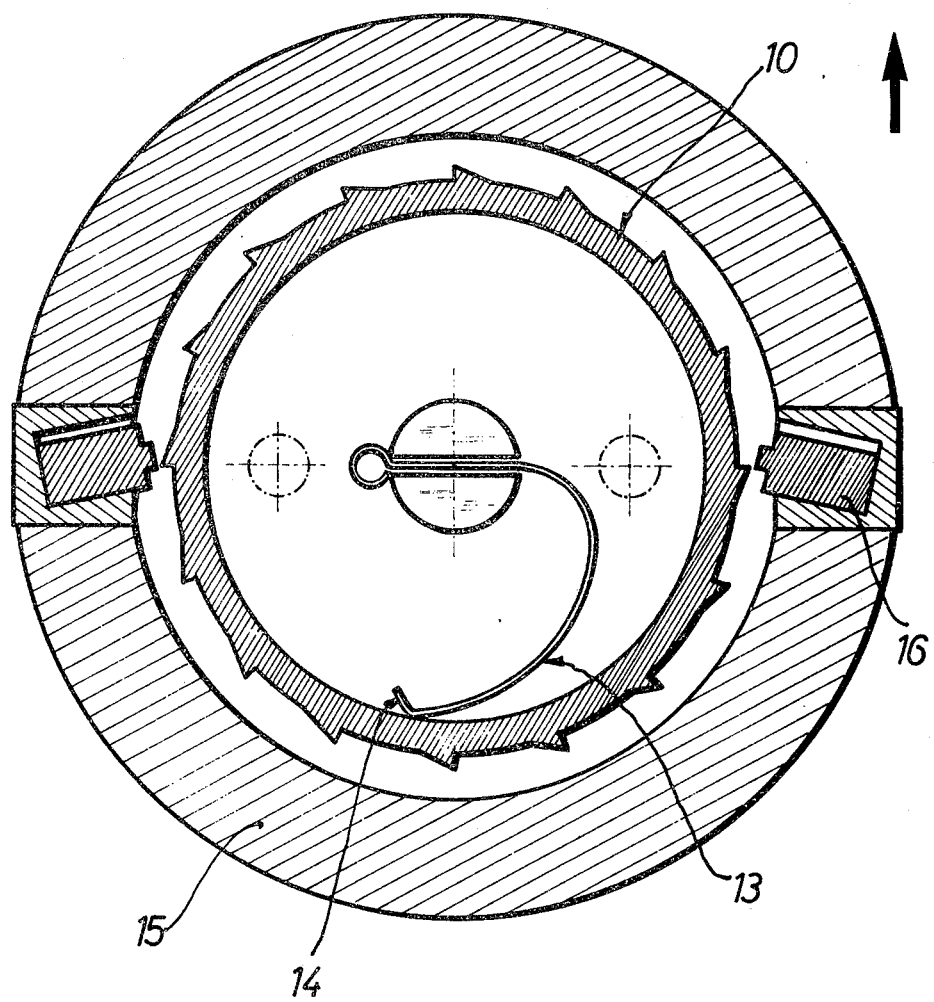

Other advantages, features and applications of the invention will become apparent from the description which now follows relating to the accompanying drawings. In the drawings:

FIG. 1 is a perspective view of the mount for the belt winder, with a ratchet-wheel, FIG. 2 is a perspective view of the winding shaft with a disc fixed onto it, FIG. 3 is a perspective view showing the way in which the locking members are associated in space, FIG. 4 shows the annular inertia member, FIG. 5 shows the strip-shaped leaf spring, FIG. 6 is a side view showing the inertia member with the spring, FIG. 7 is a plan view of the locking member, FIG. 8 is a side view of the shaft with the disc mounted on it, FIG. 9 shows the assembled locking device on the belt winder according to the invention, in the unlocked state, FIG. 10 shows the same arrangement as FIG. 9 but with the pins on the inertia member in engagement with the locking members, FIG. 11 is a view similar to FIGS. 9 and 10 but represents the stage where engagement between the pins and the locking members has terminated, FIG. 12 shows the same arrangement as FIG. 11 at the stage when the locking members are just being moved back into their unlocked, inoperative position as the winding shaft turns, FIG. 13 is a force-extension graph for a normal spring, FIG. 14 is the same graph for a spring with a negative characteristic, FIG. 15 is a graph similar to FIGS. 13 and 14 but represents a case where the action between (a) the force and (b) the extension and slip is produced by a special embodiment, such as is shown in FIG. 16 which has an additional locking device, responding to impact with the vehicle from any direction.

The U-shaped frame 1 of the belt winder according to the invention has a locking ring 2 with internal teeth 3 mounted on one side of it.

FIGS. 1–5 are, so to speak, an exploded perspective view of the locking means provided for the belt winder. The belt strip, winding spring and some other parts of the belt winder are not shown. However, it can be seen that, on assembly, the winding shaft 4 with the disc 5 mounted at the front of it, is inserted in the apertures provided in the direction of the axis, shown as a dot-and-dash line. The disc 5 carries the slotted cylindrical portion 7 in the centre of its front surface and, diametrically thereof, two pins 6.

FIGS. 3 and 7 show the locking member in the special embodiment in which, although the hole 9c is the turning point and is accordingly arranged in the centre and at the centre of gravity, a hole 9b is formed in the front half for deliberately upsetting the equilibrium relative to the point of rotation. The locking member 9 has a suitable arcuate shape to adapt it to the diameter of the disc 5, and has a plurality of locking teeth in the curved external surface of its front end. An edge 9d to engage the pin 12 of the inertia member 10 is provided on the inside, also at the front end of the locking member 9. Three, four or more locking members may be provided in the locking device, but the arrangement with two such members, as shown in the drawings, is preferred.

The locking member 9 is placed on the pin 6 of a disc 5, thereby assuming the FIG. 9 position.

The leaf spring 8 in strip form is selected for its material properties, according to the desired sensitivity and/or according to the responsiveness to the desired acceleration value. The spring is inserted in the desired pair of opposed slots 11 inside the annular inertia member 10. At the end opposite the disc 5 the inertia member 10 carries two pins 12 which are arranged diametrically of one another relative to its centre. When the locking device of FIGS. 1–5 is assembled, the pins 12 engage through the space between the two locking members 9 as shown in FIG. 9, so that there is no contact between the members 9 and the pins 12.

Mention should be made of the advantage of having the inertia member 10 of relatively solid construction as was desired for the invention. Together with the characteristic of the spring material and the arrangement of the spring, which is inserted in the slot in the cylindrical portion 7, the relatively heavy inertia member 10, which also acts as a fly-wheel, is easily adjustable. The locking members, which may take up nearly half the circular area of the disc 5, can be stable and strong compared with known apparatus. When the locking members 9 rotate about the pins 6 relative to the shaft 4, their teeth can obviously fit and engage the teeth 3 on the locking ring 2. It will be seen from FIG. 9 that the pins 12 need not necessarily touch the locking members 9. FIG. 10 shows how the pins 12 come into engagement with the members 9 when the belt strip is drawn abruptly off the winding shaft. This jerk in the belt strip or the acceleration, which in this case must have exceeded the critical acceleration value, gives rise to relative rotation between the shaft 4 and the inertia member 10. This results in the inclination of the line connecting the two pins 12 to the horizontal (shown as a dash-and-dot line) shown in FIG. 10 as compared with FIG. 9, where both are in alignment.

FIG. 11 similarly shows the locking member 9 in engagement with the locking ring 2, and it should again be pointed out that the pins 12 are not in contact with the members 9.

FIG. 12 illustrates the unlocking of the device when the belt strip is wound up. As the locking member 9 is not balanced on account of the hole 9b, i.e. its rear half 9a is heavier, it swings anticlockwise in the direction of the short, thick, slightly curved arrows inside the ring 2, i.e. into the unlocked position, when the belt strip is wound up. The turning of the belt strip and its direction of movement on being wound up are shown respectively by the two longer arrows at the right hand side and the bottom of FIG. 12.

FIG. 13 is a graph showing the force and extension of a spring acting on a locking member. The extension can be seen to increase gradually with the force. In the case of a belt winder this has a disadvantage in practice.

When the acceleration of the belt strip is gradually approaching the locking value, the locking members 9 move only slowly and hesitantly towards the teeth 3 on the ring 2. The delayed approach means that the tips of the teeth on the locking members 9 may actually approach the tips of the teeth on the ring 2. The locking members may then rebound out of engagement with the ring 2.

A kind of double action would therefore be desirable, whereby the locking members could be actuated by a spring which had a negative or descending characteristic as shown in FIG. 14. In an apparatus with such a characteristic (FIG. 14) the locking members could come immediately into engagement with the teeth 3 of the locking ring 2, without any delay. Of course it is expensive and difficult to provide negative springs.

However the desired effect, as illustrated in the FIG. 15 graph, can unexpectedly be obtained with the embodiment of the invention shown in FIG. 16.

FIG. 16 is a view from the front right hand side as in FIGS. 1–5, of the annular inertia member 10 which acts as a fly-wheel. A curved spring 13 is arranged in the slot in the cylindrical portion 7 on the main shaft 4; the outer end of the spring has an off-set or bent portion 14 at its outer end. This portion rests on the smooth inside surface of the inertia member 10. When the shaft 4 is turned rapidly, the inertia member 10 immediately begins moving as a result of the friction between the off-set end 14 of the spring 13 and the inertia member 10. However sliding soon takes place and the inertia member 10 is left behind. Its pins 12, which are only indicated in dash-and-dot lines in FIG. 16, then come into engagement with the locking members 9. Owing to the difference between the static and dynamic friction (see the graph in FIG. 15) there is a binary or double effect, and the locking members 9 drop into engagement with the teeth 3 on the ring 2.

FIG. 16 shows an additional blocking means with movable inert weights 16. These rest in a type of pocket in an adjusting cylinder which in turn fits into an annular support 15. When the blocking device is struck from the right as in FIG. 16, the left hand inert member 16 will come into engagement with the teeth on the inertia member 10; conversely when there is impact from the left the right hand member 16 will bring about the locking action. Thus this embodiment is seen to be a belt winder which produces a locking action immediately, without any delay either when the belt strip is pulled out abruptly or when the vehicle containing the winder is struck from any of the three directions in space.

I claim:

1. A belt winder for safety belts in vehicles, comprising a rotatable shaft mounted on a housing onto which is wound the end of the belt which can be drawn out of the winder, and further comprising a locking mechanism whereby the shaft is locked to prevent any more of the belt from being drawn out when a predetermined angular acceleration is exceeded, the locking mechanism comprising an inertia member rotatably mounted on the shaft, a locking member carried by the shaft by means of a pin and which can be moved into a locking position to engage an abutment member fixed to the housing through rotation of the inertia member relative to the shaft when there is rapid angular acceleration of the shaft, characterised in that the inertia member is in the form of a ring carrying at least one pin, and said inertia member including engagement means for a spring, the inertia member being coupled to the shaft by the spring, the locking member arranged between the inertia member and the shaft and having an edge for engaging the pin carried by said ring.

2. A winder according to claim 1, characterized in that the spring is in the form of a flat strip, said shaft has a front surface containing a central slot for coupling the spring thereto and the inside of the ring of the inertia member has a plurality of groups of slots arranged diametrically of said central slot to receive the spring.

3. A winder according to claim 1, characterised in that a disc mounted on the shaft carries at least one pin for at least one locking member.

4. A winder according to claim 3, characterised in that a hole in the locking member for the pin on the disc is arranged at its centre of gravity, and that the locking member is arcuate with locking teeth on the curved outer edge of the front end, and with the engaging edge for the pin of the inertia member at the other, inner edge of the same end.

5. A winder according to claims 3, characterised in that one end of the locking member is heavier than the other.

6. A winder according to claim 1, characterised in that the inertia member has locking teeth at the outer periphery and is coupled to the shaft by means of a curved spring, the outer end of which lies against the inside of the annular inertia member at a bias.

* * * * *